(12) United States Patent
Feng et al.

(10) Patent No.: US 8,625,519 B2
(45) Date of Patent: Jan. 7, 2014

(54) CARRIER AGGREGATION METHOD AND CARRIER AGGREGATION DEVICE

(75) Inventors: Shulan Feng, Beijing (CN); Jinnan Liu, Beijing (CN); Haiguang Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 188 days.

(21) Appl. No.: 13/278,678

(22) Filed: Oct. 21, 2011

(65) Prior Publication Data

US 2012/0039293 A1 Feb. 16, 2012

Related U.S. Application Data

(63) Continuation of application No. PCT/CN2009/071384, filed on Apr. 21, 2009.

(51) Int. Cl.
*H04W 4/00* (2009.01)

(52) U.S. Cl.
USPC .......................................... 370/329

(58) Field of Classification Search
USPC ........................................ 370/329, 252, 350
See application file for complete search history.

(56) References Cited

U.S. PATENT DOCUMENTS

| | | | |
|---|---|---|---|
| 5,956,642 | A | 9/1999 | Larsson et al. |
| 2005/0232137 | A1 | 10/2005 | Hosur et al. |
| 2006/0116123 | A1 | 6/2006 | Purnadi et al. |
| 2006/0281465 | A1 | 12/2006 | McBeath et al. |
| 2010/0254329 | A1* | 10/2010 | Pan et al. ...................... 370/329 |
| 2011/0051711 | A1* | 3/2011 | Kishiyama et al. ........... 370/350 |
| 2011/0211489 | A1* | 9/2011 | Chung et al. ................... 370/252 |
| 2011/0211541 | A1* | 9/2011 | Yuk et al. ....................... 370/329 |

FOREIGN PATENT DOCUMENTS

| | | |
|---|---|---|
| CN | 1245623 A | 2/2000 |
| CN | 101404539 A | 4/2004 |
| CN | 1753399 A | 3/2006 |
| CN | 101091410 A | 12/2007 |
| CN | 101127719 A | 2/2008 |
| CN | 101189903 A | 5/2008 |
| CN | 101228726 A | 7/2008 |
| CN | 101232697 A | 7/2008 |
| CN | 101330372 A | 12/2008 |
| WO | WO 2009/035249 A1 | 3/2009 |
| WO | WO 2010/127480 A1 | 11/2010 |

OTHER PUBLICATIONS

"Text Proposal for LTE-A Spectrum Aggregation Scenarios and Their Impact on UE Architecture", by Motorola, 3GPP TSG RAN WG1 Meeting #54bis, R1-083828, Sep. 29-Oct. 3, 2008 (11 pages).*

(Continued)

*Primary Examiner* — Albert T Chou (57) ABSTRACT

A carrier aggregation method and a carrier aggregation device are related to the field of communications technologies. The method includes: acquiring information of available spectrum resources; selecting an available frequency band less than a maximum design bandwidth and greater than or equal to a minimum design bandwidth as a base frequency band when the available frequency band exists in the available spectrum resources; determining a frequency band with a width being the maximum design bandwidth, where the frequency band with the width being the maximum design bandwidth has a center frequency which is an integral multiple of a minimum channel raster and is the closest to a center of the base frequency band; and determining an aggregated carrier by using the frequency band with the width being the maximum design bandwidth.

19 Claims, 6 Drawing Sheets

(56) References Cited

OTHER PUBLICATIONS

International Search Report dated Jan. 28, 2010 in connection with International Patent Application No. PCT/CN2009/071384.

Rakesh Rajbanshi, et al., "An Efficient Implementation of NC-OFDM Transceivers for Cognitive Radios", 2006 IEEE, 5 pages.

Kelvin Chou, et al., "Mobility Management with Multi-Carrier Support in IEEE 802.16m", Mar. 10, 2008, 8 pages.

Jaehee Cho, et al., Proposed 802.16m Frame Structure for multi-carrier support, May 15, 2008, 5 pages.

"Updated Views on Support of Wider Bandwidth in LTE-Advanced", NTT Docomo, Inc., 3GPP TSG RAN WG1 Meeting #54bis, Sep. 29-Oct. 3, 2008, 21 pages.

"Non-backward compatible component carriers for asymmetric carrier aggregation", Panasonic, 3GPP TSG RAN WG1 Meeting #55, Nov. 10-14, 2008, 3 pages.

Written Opinion of the International Searching Authority dated Feb. 25, 2010 in connection with International Patent Application No. PCT/CN2009/071645.

Written Opinion of the International Searching Authority dated Jan. 28, 2010 in connection with International Patent Application No. PCT/CN2009/071384.

International Search Report dated Feb. 25, 2010 in connection with International Patent Application No. PCT/CN2009/071645.

Search Report dated Oct. 24, 2012 in connection with Chinese Patent Application No. 2009801467475.

"Impact of CA in LTE-A on RAN3", Huawei, 3GPP TSG WG3 Meeting #64bis, Mar. 23-26, 2009, 3 pages.

\* cited by examiner

CARRIER AGGREGATION METHOD AND CARRIER AGGREGATION DEVICE

This application is a continuation of International Application No. PCT/CN2009/071384, filed on Apr. 21, 2009, which is hereby incorporated by reference in its entirety.

TECHNICAL FIELD

The present invention relates to the field of communications technologies, and in particular, to a carrier aggregation method and a carrier aggregation device.

BACKGROUND

In the field of communications technologies, with the daily increase of radio services, the requirement for the radio data transmission rate becomes higher and higher. The technology demands of International Mobile Telecommunication-Advanced (IMT-Advanced) specify that the future radio communication system needs to be capable of supporting a higher data rate. In order to support high-speed data transmission, the following technical means may be used. On one hand, the frequency spectrum utilization may be improved, for example, the frequency spectrum utilization in the conventional bandwidth may be improved by using high order modulation, a multi-antenna technology, and an Orthogonal Frequency Division Multiplexing (OFDM) technology; on the other hand, the transmission bandwidth of the system may be increased. Taking an LTE-Advanced (LTE-A) system as an example, the maximum transmission bandwidth of the system is 20 MHz, and in order to meet a greater bandwidth demand and be compatible with the conventional third Generation mobile communication system or Long Term Evolution (LTE), many manufacturers propose that a carrier aggregation technology is used in new systems such as LTE-A, so as to meet the requirement of high-speed data transmission. The carrier aggregation technology is to aggregate multiple carriers together in a conventional system, so as to form a higher transmission bandwidth, thereby improving the data transmission rate.

The currently proposed carrier aggregation solutions include continuous carrier aggregation and discontinuous carrier aggregation. In the continuous carrier aggregation, multiple aggregated carriers aggregated together are continuous; and in the discontinuous carrier aggregation, the aggregated carriers are discontinuous. The bandwidths of the multiple aggregated carriers participating in the aggregation may be the same or different, and the bandwidths of the aggregated carriers are all conventional carrier bandwidths of the system. The minimum working bandwidth of the conventional carrier in the system is 1.4 MHz, and the maximum working bandwidth may be up to 20 MHz.

The conventional carrier aggregation technology has at least the following problems. Because each of the multiple aggregated carriers participating in the aggregation has its own synchronization channel, broadcast channel, and baseband processing unit, not only the spectrum resources are consumed, but also the complexity for implementing the system is increased.

SUMMARY

Embodiments of the present invention provide a carrier aggregation method and a carrier aggregation device, so as to effectively utilize the spectrum resources and decrease the system complexity on the basis of implementing the carrier aggregation.

In order to solve the technical problems, an embodiment of the present invention provides a carrier aggregation method, where the carrier aggregation process includes:

acquiring information of available spectrum resources;

selecting an available frequency band less than a maximum design bandwidth and greater than or equal to a minimum design bandwidth as a base frequency band when the available frequency band exists in the available spectrum resources;

determining a frequency band with a width being the maximum design bandwidth, where the frequency band with the width being the maximum design bandwidth has a center frequency which is an integral multiple of a minimum channel raster and is the closest to a center of the base frequency band; and determining an aggregated carrier by using the frequency band with the width being the maximum design bandwidth.

An embodiment of the present invention further provides a carrier aggregation device, which includes:

an acquisition module, configured to acquire information of available spectrum resources;

a determination module, configured to acquire the information of the available spectrum resources from the acquisition module, and select an available frequency band less than a maximum design bandwidth and greater than or equal to a minimum design bandwidth as a base frequency band when the available frequency band exists in the available spectrum resources;

a division module, configured to determine a frequency band with a width being the maximum design bandwidth, where the frequency band with the width being the maximum design bandwidth has a center frequency which is an integral multiple of a minimum channel raster and is the closest to a center of the base frequency band; and an aggregation module, configured to determine an aggregated carrier by using the frequency band with the width being the maximum design bandwidth.

It can be known from the foregoing solutions that, in the embodiments of the present invention, the information of the available spectrum resources is acquired; when the available frequency band less than the maximum design bandwidth and greater than or equal to the minimum design bandwidth exists in the available spectrum resources, and the frequency band with the width being the maximum design bandwidth is divided based on the available frequency band, so as to determine the aggregated carrier; multiple aggregated carriers are aggregated into a higher frequency band by using the carrier aggregation technology according to the embodiment of the present invention, so as to reduce the number of the synchronization channels, the broadcast channels, and the baseband processing units required by the conventional carrier aggregation technology, lower the system complexity, and effectively utilize the spectrum resources, and meanwhile, meet the requirement of high-speed data transmission.

BRIEF DESCRIPTION OF THE DRAWINGS

To illustrate the technical solutions according to the embodiments of the present invention more clearly, the accompanying drawings for describing the embodiments are introduced briefly in the following. Apparently, the accompanying drawings in the following description are only some embodiments of the present invention, and persons of ordinary skill in the art may also derive other drawings from the accompanying drawings without creative efforts.

DETAILED DESCRIPTION

The technical solutions of the present invention are described in detail in the following with reference to the accompanying drawings. It should be noted that the following embodiments are only a part rather than all of the embodiments of the present invention. All other embodiments obtained by persons of ordinary skill in the art based on the embodiments of the present invention without creative efforts shall fall within the protection scope of the present invention.

Embodiment 1

Figure 1:
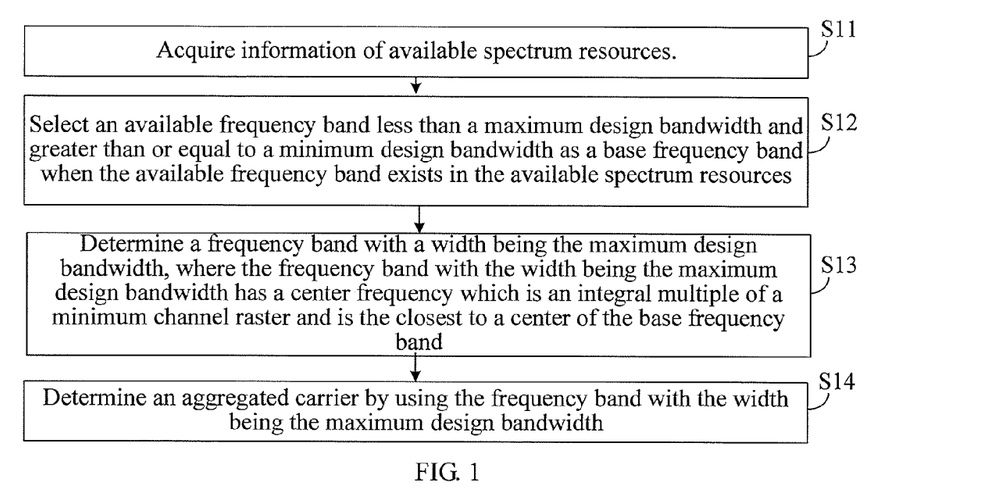
FIG. 1 is a schematic flow chart of a carrier aggregation method according to Embodiment 1 of the present invention.

FIG. 1 is a schematic flow chart of a carrier aggregation method according to Embodiment 1 of the present invention. The carrier aggregation process may include:

Step S11: Acquire information of available spectrum resources.

Step S12: Select an available frequency band less than a maximum design bandwidth and greater than or equal to a minimum design bandwidth as a base frequency band when the available frequency band exists in the available spectrum resources.

Step S13: Determine a frequency band with a width being the maximum design bandwidth, where the frequency band with the width being the maximum design bandwidth has a center frequency which is an integral multiple of a minimum channel raster and is the closest to a center of the base frequency band.

Step S14: Determine an aggregated carrier by using the frequency band with the width being the maximum design bandwidth.

In this embodiment, a frequency band is extended by using the frequency band that is less than the maximum design bandwidth and greater than or equal to the minimum design bandwidth in the available spectrum resources as the base frequency band, to determine carrier aggregation, so as to reduce the required number of the synchronization channels, the broadcast channels, and the baseband processing units, lower the system complexity, and effectively utilize the spectrum resources, and meanwhile, meet the requirement of high-speed data transmission.

Further, the embodiment may further include: determining whether all the already determined aggregated carriers reach a preset criterion, if all the already determined aggregated carriers reach the preset criterion, the carrier aggregation process is stopped; and if all the determined aggregated carriers do not reach the preset criterion, the carrier aggregation process is repeated.

According to the embodiment of the present invention, the multiple aggregated carriers may be aggregated into a higher frequency band, so that the aggregated carrier reaches the preset criterion. The determining whether all the already determined aggregated carriers reach the preset criterion includes: determining whether a sum of the bandwidths of all the already determined aggregated carriers meets a requirement for aggregating bandwidths, and/or whether the number of all the already determined aggregated carriers reaches the maximum carrier number. After multiple times of carrier aggregation, the carrier aggregation process may be stopped when it is determined that the sum of the bandwidths of the multiple determined aggregated carriers meets the requirement for aggregating the bandwidths. It can be understood that, the carrier aggregation process may also be terminated when it is determined that the number of the multiple determined aggregated carrier reaches the maximum carrier number. For example, a total bandwidth demand of a system is 1 GHz, and the supportable maximum carrier number is 6, if a sum of total available bandwidths of the aggregated carriers is greater than or equal to 1 GHz, or the number of the aggregated carrier is 6, the carrier aggregation process is stopped.

Much further, the determining the aggregated carrier by using the frequency band with the width being the maximum design bandwidth may include: directly determining the frequency band with the width being the maximum design bandwidth as the aggregated carrier.

Alternatively, in another implementation, an available frequency, which is the farthest from the center frequency, is found in the frequency band with the width being the maximum design bandwidth; a width between the center frequency and the available frequency, which is the farthest from the center frequency, is determined; and an aggregated carrier with a bandwidth being 2 times of the determined width, where a carrier center frequency of the aggregated carrier is the center frequency.

Figure 2:
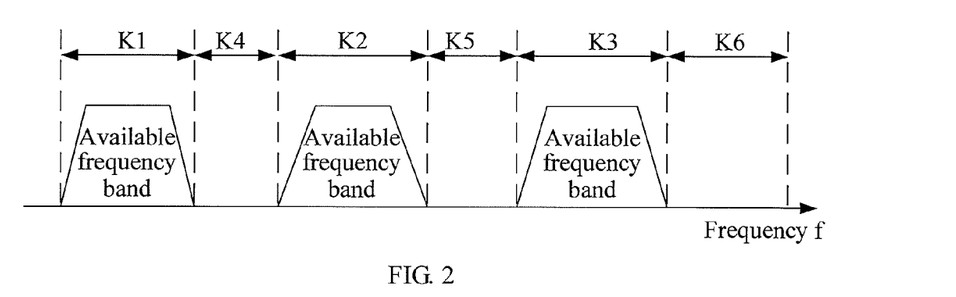
FIG. 2 is a schematic diagram showing availability of spectrum resources according to an embodiment of the present invention.

In the method embodiment, some of the spectrum resources are available frequency bands, and others are unavailable frequency bands. FIG. 2 is a schematic diagram showing availability of spectrum resources according to an embodiment of the present invention. In FIG. 2, frequency bands K1, K2, and K3 are available frequency bands, and K4, K5, and K6 are unavailable frequency bands. The available frequency band refers to a frequency band adopted by the current system, for example, an idle frequency band that is not used by other adjacent systems, and is greater than or equal to a certain width. The unavailable frequency band refers to a frequency band that cannot be adopted by the current system, for example, a frequency band used by other adjacent systems, or an idle frequency band with a width less than a certain width, for example, an idle frequency band that is less than 200 KHz may be considered as an unavailable frequency band in the system.

Figure 3:
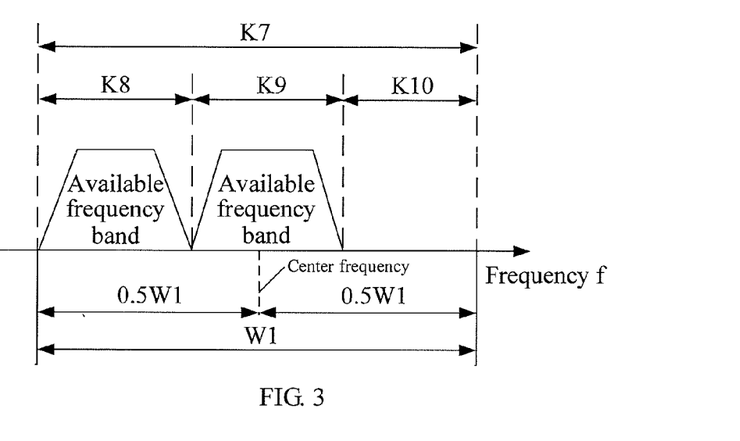
FIG. 3 is a schematic diagram of an aggregated carrier including multiple available frequency bands according to an embodiment of the present invention.

In a conventional carrier aggregation technology, multiple available frequency bands are aggregated as separate aggregated carriers, and each aggregated carrier needs to be allocated with its own synchronization channel, broadcast channel, and baseband processing unit, and the implementation is complex; in contrast, in the technical solution according to the embodiment of the present invention, a frequency band is divided from the selected available frequency band with a frequency bandwidth between the maximum design bandwidth and the minimum design bandwidth, to determine the carrier aggregation, and the aggregated carrier may include multiple available frequency bands. FIG. 3 is a schematic diagram of an aggregated carrier including multiple available frequency bands according to an embodiment of the present invention. In FIG. 3, an aggregated carrier K7 includes available frequency bands K8 and K9, and an unavailable frequency band K10, and a bandwidth of the aggregated carrier, which is divided based on the available frequency band K9, is W1. Because the aggregated carrier K7 needs only one synchronization channel, one broadcast channel, and one baseband processing unit, it is unnecessary to allocate a synchronization channel, a broadcast channel, and a baseband processing unit to each of the available frequency bands, thereby saving resources. The aggregated carrier K7 includes available and unavailable frequency bands, after the carrier aggregation is completed, if data transmission needs to be performed in the aggregated carrier K7, transmission and scheduling of data may be performed in the available frequency bands, and transmission and scheduling of data may not be performed in the unavailable frequency band.

In the conventional carrier aggregation technology, the aggregated carrier is a conventional carrier in the system, and a frequency band that is less than a minimum working bandwidth cannot be effectively used; in the method according to Embodiment 1 of the present invention, multiple available frequency bands including the frequency band that is less than the minimum working bandwidth in the aggregated carrier can be used, so as to improve the frequency spectrum utilization.

In this embodiment, the maximum design bandwidth may be the maximum working bandwidth of the system; and the minimum design bandwidth may be the minimum working bandwidth of the system. The frequency band with a width being the maximum working bandwidth is determined as the aggregated carrier by using the available frequency band, which is less than the maximum working bandwidth and greater than or equal to the minimum working bandwidth, as the base frequency band, where the frequency band with the width being the maximum design bandwidth has a center frequency which is an integral multiple of a minimum channel raster and is the closest to a center of the base frequency band, so that the bandwidth of the carriers participating in aggregation is maximized, so as to further reduce the number of the aggregated carriers, and save the resources. It can be understood by those skilled in the art that, the maximum design bandwidth may also be other values that are less than the maximum working bandwidth, and the minimum design bandwidth may also be other values that are greater than the minimum working bandwidth. However, an optimal choice is generally to use the maximum working bandwidth as the maximum design bandwidth, and use the minimum working bandwidth as the minimum design bandwidth, but the embodiment of the present invention is not limited thereto.

In an implementation, when an available frequency band less than the maximum design bandwidth and greater than or equal to the minimum design bandwidth exists in the available spectrum resources, the process of selecting the available frequency band as the base frequency band may specifically include: selecting an available frequency band closest to an already determined aggregated carrier from the multiple available frequency bands as a base frequency band when the multiple available frequency bands, which are less than the maximum design bandwidth and greater than or equal to the minimum design bandwidth, exist in the available spectrum resources; or selecting an available frequency with the width being the maximum width in the multiple available frequency bands as a base frequency band.

Figure 4:
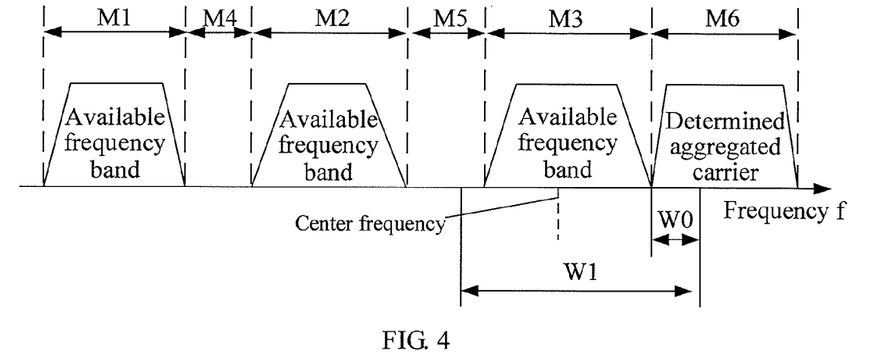
FIG. 4 is a schematic diagram of selecting an available frequency band that is the closest to an already determined aggregated carrier from multiple available frequency bands as a base frequency band in carrier aggregation according to an embodiment of the present invention.

FIG. 4 is a schematic diagram of selecting an available frequency band closest to an already determined aggregated carrier as a base frequency band from multiple available frequency bands in carrier aggregation according to an embodiment of the present invention. In FIG. 4, available frequency bands M1, M2, and M3, unavailable frequency bands M4, and M5, and an already determined aggregated carrier M6 exist, and the available frequency band M3 that is the closest to M6 is selected from the three available frequency bands as the base frequency band, so that the aggregated carriers are as continuous as possible. A new aggregated carrier determined based on the available frequency band M3 may be overlapped with the originally determined aggregated carrier M6, and as shown in FIG. 4, an overlapped part of the new aggregated carrier and the already determined aggregated carrier M6 is W0. It can be understood that, when data is transmitted in the aggregated carriers, the overlapped part W0 of the new aggregated carrier and the already determined aggregated carrier M6 cannot be repeatedly used. For example, if the overlapped part W0 is an available frequency band in the aggregated carrier M6, the frequency band W0 is treated as an unavailable frequency band in the aggregated carrier based on the band M3; or if the frequency band W0 is used when the new aggregated carrier is used to transmit data, the frequency band W0 of the already determined aggregated carrier M6 cannot be repeatedly used when the determined aggregated carrier M6 is used to transmit data.

Figure 5:
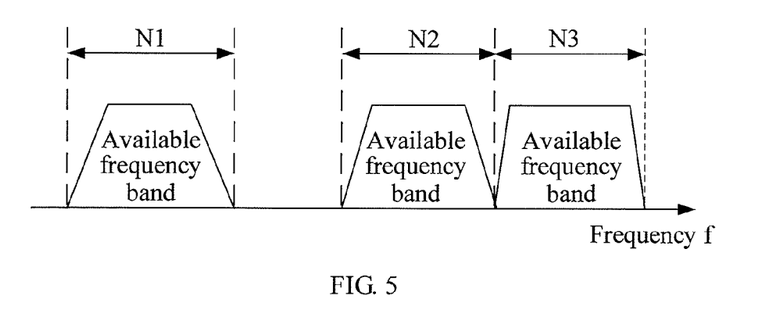
FIG. 5 is a schematic diagram of selecting an available frequency band with a maximum width as a base frequency band from multiple available frequency bands in carrier aggregation according to an embodiment of the present invention.

FIG. 5 is a schematic diagram of selecting an available frequency band with a maximum width as a base frequency band from multiple available frequency bands in carrier aggregation according to an embodiment of the present invention. In FIG. 5, three available frequency bands N1, N2, and N3 exist, where the bandwidth of N3 is maximum, and accordingly, N3 may be used as a base frequency band for subsequent carrier aggregation.

In another implementation, when available frequency bands less than the maximum design bandwidth and greater than or equal to the minimum design bandwidth exist in the available spectrum resources, the process of selecting the available frequency band as the base frequency band may specifically include: using multiple available frequency bands less than the maximum design bandwidth and greater than or equal to the minimum design bandwidth as the base frequency bands when the multiple available frequency bands exist in the available spectrum resources.

Correspondingly, the determining the frequency band with the width being the maximum design bandwidth, where the frequency band with the width being the maximum design bandwidth has a center frequency which is an integral multiple of a minimum channel raster and is the closest to a center of the base frequency band includes: finding multiple frequency bands with the width being the maximum design bandwidth, where the frequency bands with the width being the maximum design bandwidth respectively have a center frequency which is an integral multiple of the minimum channel raster and the frequency bands with the width being the maximum design bandwidth are the closest to the center of the base frequency band; comparing the sums of the widths of available frequency bands in each one of the multiple frequency bands with the width being the maximum design bandwidth respectively; and determining the frequency band with a maximum sum in the multiple frequency bands with the width being the maximum design bandwidth as the aggregated carrier. In the implementation, the sums of the widths of the available frequency bands in each base frequency band of the multiple base frequency bands are compared, and the frequency band with the maximum sum of the widths of the available frequency bands is determined as the aggregated carrier, so as to maximize the bandwidth of the available frequency bands in the aggregated carrier.

Further, the carrier aggregation process may further include identifying the already determined aggregated carrier as an unavailable frequency band before determining a new aggregated carrier of the system.

Further, the carrier aggregation process may further include: selecting a frequency band equal to the maximum design bandwidth from available frequency bands greater than or equal to the maximum design bandwidth as the aggregated carrier, when the available frequency bands exist in the available spectrum resources. The process of selecting the aggregated carrier may specifically include: selecting a frequency band being the closest to the already determined aggregated carrier and equal to the maximum design bandwidth from the available frequency bands as the aggregated carrier; or selecting a frequency band being the closest to the unavailable frequency band and equal to the maximum design bandwidth from the available frequency bands as the aggregated carrier.

Figure 6:
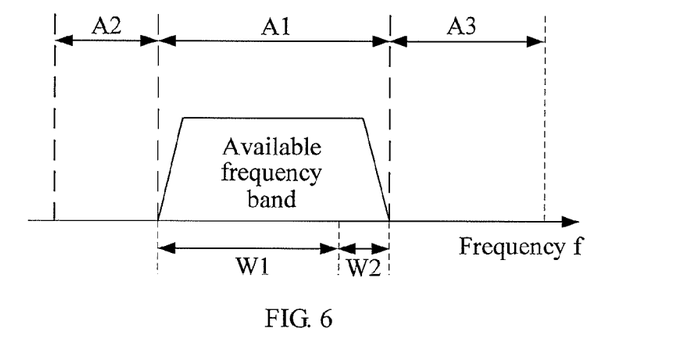
FIG. 6 is a schematic diagram of a type of aggregated carrier selection according to an embodiment of the present invention.

FIG. 6 is a schematic diagram of a type of aggregated carrier selection according to an embodiment of the present invention. In FIG. 6, available frequency band A1 greater than or equal to the maximum design bandwidth, and unavailable frequency bands A2 and A3 exist. A frequency band equal to the maximum design bandwidth W1 may be selected from A1 as the aggregated carrier. In the selection, the maximum design bandwidth W1 is selected to be close with the unavailable frequency band A2 or A3 (taking A2 in FIG. 6 as an example), so as to maximize the remaining available frequency band W2, and bring convenience for subsequent carrier aggregation.

Figure 7:
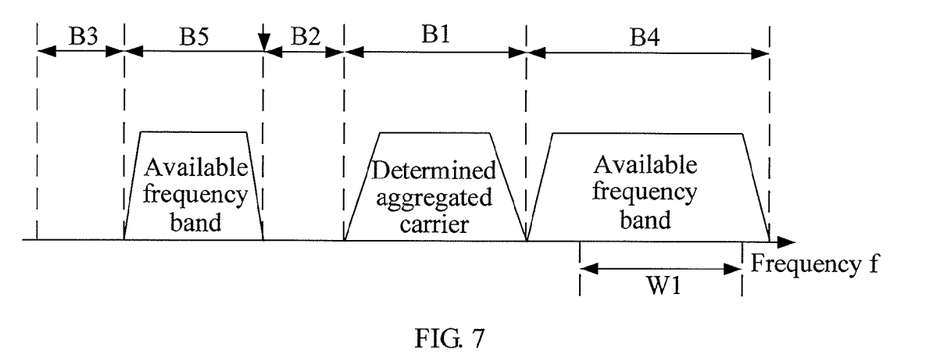
FIG. 7 is a schematic diagram of another type of aggregated carrier selection according to an embodiment of the present invention.

FIG. 7 is a schematic diagram of another type of aggregated carrier selection according to an embodiment of the present invention. In FIG. 7, an already determined aggregated carrier B1, unavailable frequency bands B2 and B3, and available frequency bands B4 and B5 exist. Compared with the band B5, the available frequency band B4 is the closest to the already determined aggregated carrier B1, so that a frequency band W1 equal to the maximum design bandwidth is selected in the available frequency band B4 as an aggregated carrier, and the already determined aggregated carrier is to be close to the aggregated carrier as much as possible.

Figure 8:
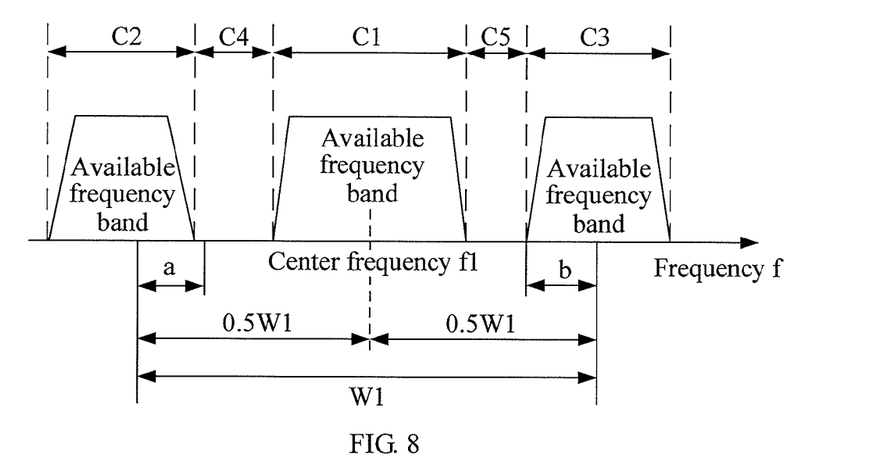
FIG. 8 is a schematic diagram of determining an aggregated carrier based on a base frequency band according to an embodiment of the present invention.

FIG. 8 is a schematic diagram of determining an aggregated carrier based on a base frequency band according to an embodiment of the present invention. In FIG. 8, in the available spectrum resources, an available frequency band C1 less than the maximum design bandwidth and greater than or equal to the minimum design bandwidth exists, and the available spectrum resources further include other available frequency bands C2 and C3, and unavailable frequency bands C4 and C5. With the available frequency band C1 as the base frequency band, a frequency f1 being the closest to a central position of the available frequency band C1 and being an integral multiple of the minimum channel raster is found as the center frequency, and a frequency band is determined as the aggregated carrier whose width is the maximum design bandwidth W1. It can be seen that, the determined aggregated carrier includes a part of each one of the other available frequency bands C2 and C3, that is, available frequency bands a and b. After the carrier aggregation is completed, in data transmission and resource scheduling, data transmission may be achieved in the available frequency bands C1, a and b of the determined aggregated carrier. Further, an adequate guard band can be reserved when data transmission is performed in the available frequency bands C1, a, and b, so as to prevent interference to users of the unavailable frequency band.

Specific description is made with 3rd Generation Partnership Project (3GPP) as an example, the minimum channel raster of the 3GPP carrier frequency is 100 KHz, which requires that the center frequency of the system carrier is an integral multiple of 100 KHz, and a frequency being the closest to the center of the available frequency band C1 and being an integral multiple of 100 KHz can be found as the center frequency of the determined aggregated carrier.

Figure 9:
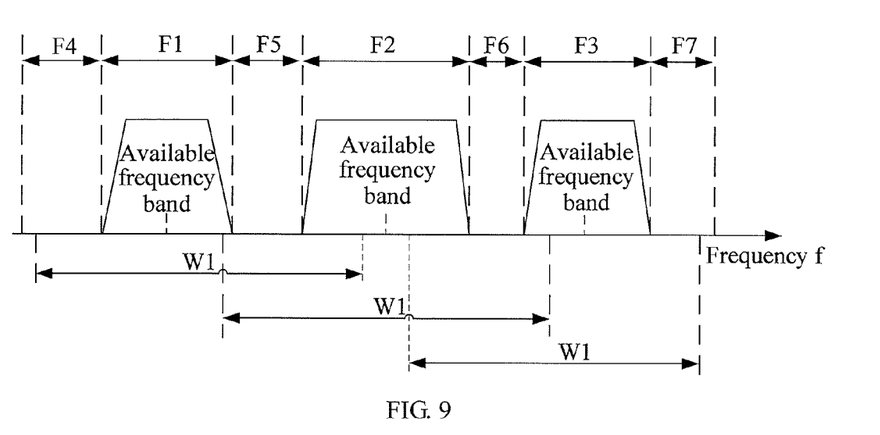
FIG. 9 is a schematic diagram of selecting an aggregated carrier according to an embodiment of the present invention.

FIG. 9 is a schematic diagram of selecting an aggregated carrier according to an embodiment of the present invention. In FIG. 9, available frequency bands F1, F2, and F3, and unavailable frequency bands F4, F5, F6, and F7 are included. Based on each available frequency band as the base frequency band, 3 frequency bands with the width being the maximum design bandwidth W1 are determined respectively. The sum of the bandwidths of the available frequency bands in the frequency band W1, which is determined based on F2 as a base frequency band, is maximum, and accordingly F2 is selected as the aggregated carrier.

Figure 10:
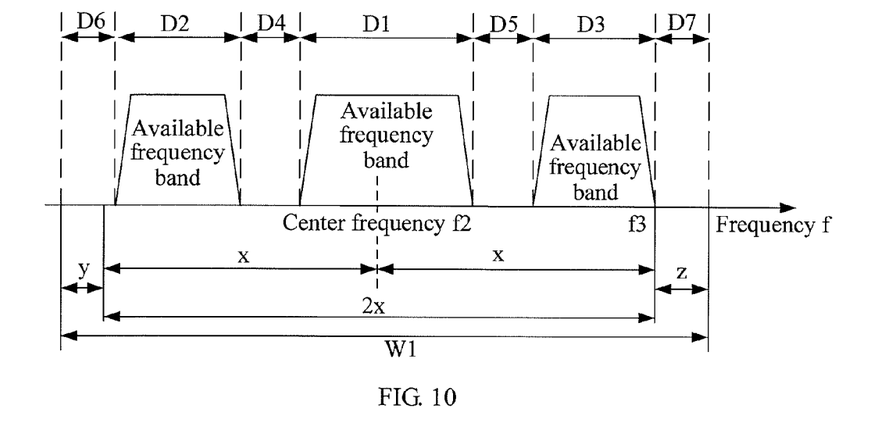
FIG. 10 is a schematic diagram of determining an aggregated carrier from a frequency band with a width being a maximum design bandwidth according to an embodiment of the present invention.

As described in foregoing embodiments, in the process of determining the aggregated carrier, the frequency band with the width being the maximum design bandwidth may be directly used as the aggregated carrier; if an edge part of the aggregated carrier is an unavailable frequency band, the bandwidth of the aggregated carrier may be further reduced, so as to reduce the unavailable frequency band of the edge part of the aggregated carrier, and save resources. In an optimized implementation, an available frequency that is the farthest from the center frequency is found in the frequency band with the width being the maximum design bandwidth; a width between the center frequency and the available frequency that is the farthest from the center frequency is determined; and the aggregated carrier with a bandwidth being 2 times of the determined width, where a center frequency of the aggregated carrier is the center frequency. Specific description is made with reference to an accompanying drawing below. FIG. 10 is a schematic diagram of determining an aggregated carrier from a frequency band with a width being a maximum design bandwidth according to an embodiment of the present invention. In FIG. 10, a frequency band W1 with a center frequency f2 and with a width being the maximum design bandwidth is determined, and the frequency band W1 includes available frequency bands D1, D2, and D3, and unavailable frequency bands D4, D5, D6, and D7. An available frequency that is the farthest from the center frequency f2 is the frequency f3. If the distance from f3 to f2 is x, 2x may be used as a bandwidth of an aggregated carrier, to determine the aggregated carrier.

The efficiency for determining the aggregated carrier by using the solution is higher than the efficiency for directly using the maximum design bandwidth W1 as the aggregated carrier. In this solution, the determined aggregated carrier does not include unavailable frequency bands y and z, so that the number of the unavailable frequency bands in the aggregated carrier is decreased, thereby reducing signaling that is required when the aggregated carrier is used to transmit data, and saving resources.

The available frequency band in the embodiment may be a consecutive available frequency band whose width is greater than a certain width. For ease of description, description is made with reference to a Long Term Evolution (LTE) system in 3GPP as an example below.

Every 12 continuous sub-carriers in the LTE system form a Resource Block (RB). A minimum resource allocation unit is 1 RB, and an interval between the sub-carriers of LTE is generally 15 KHz, so that a frequency band occupied by the minimum resource allocation unit of the LTE system is generally 180 KHz. Some frequency bands in the spectrum resources of LTE may be occupied by other systems such as a GSM system, and the occupied frequency bands become unavailable frequency bands. In practical application, a certain guard band may exist between the frequency bands. The width of the guard band is selected to be 320 KHz in this embodiment, and therefore the minimum available bandwidth by calculation is 500 KHz. An idle frequency band is considered as an available frequency band only when the idle frequency band is higher than 500 KHz. When acquiring the information of the available spectrum resources, idle frequency bands that are greater than or equal to the 500 KHz bandwidth are found, and are considered as available frequency bands of the LTE system.

Alternatively, the minimum working bandwidth is used as the minimum available bandwidth, and a consecutive available frequency band that is greater than or equal to the minimum working bandwidth of the system is used as an available frequency band of the system. For example, the minimum working bandwidth of the LTE system is 1.4 MHz, idle frequency bands that are greater than or equal to the 1.4 MHz bandwidth are found, and the idle frequency bands are considered as the available frequency bands of the LTE system.

Alternatively, in the LTE system, when the working bandwidth is 20 MHz, and a minimum resource allocation unit of type 0 is 4 RBs, then the minimum available bandwidth of the system may be determined as the bandwidth of 4 RBs plus a certain guard band, for example, be determined as 1 MHz.

The aggregated carrier determined by using the forgoing method embodiment may include multiple available frequency bands, and the minimum available bandwidth of the available frequency bands may be set. In view of maximizing the frequency resource utilization, the smaller the minimum available bandwidth, the better, for example, the frequency band, which is occupied by the minimum resource allocation unit supported by the system, plus the guard band is selected; and in view of simplifying the design, the higher the minimum available bandwidth, the better, for example, the minimum working bandwidth supported by the system is selected. The idle frequency band may be specified herein as follows. After signals transmitted by other systems with a specific power in the idle frequency band reach a current system node, other system nodes' signal energy received by the current system node should be less than a certain value; alternatively, after a signal transmitted by the current system node with a specific power in the idle frequency band reaches other system nodes, the current system node's signal energy received by other system nodes should be less than a certain value, where the nodes refer to all wireless communication equipment in the system, including, but not limited to, base stations, and terminals.

Embodiment 2

Figure 11:
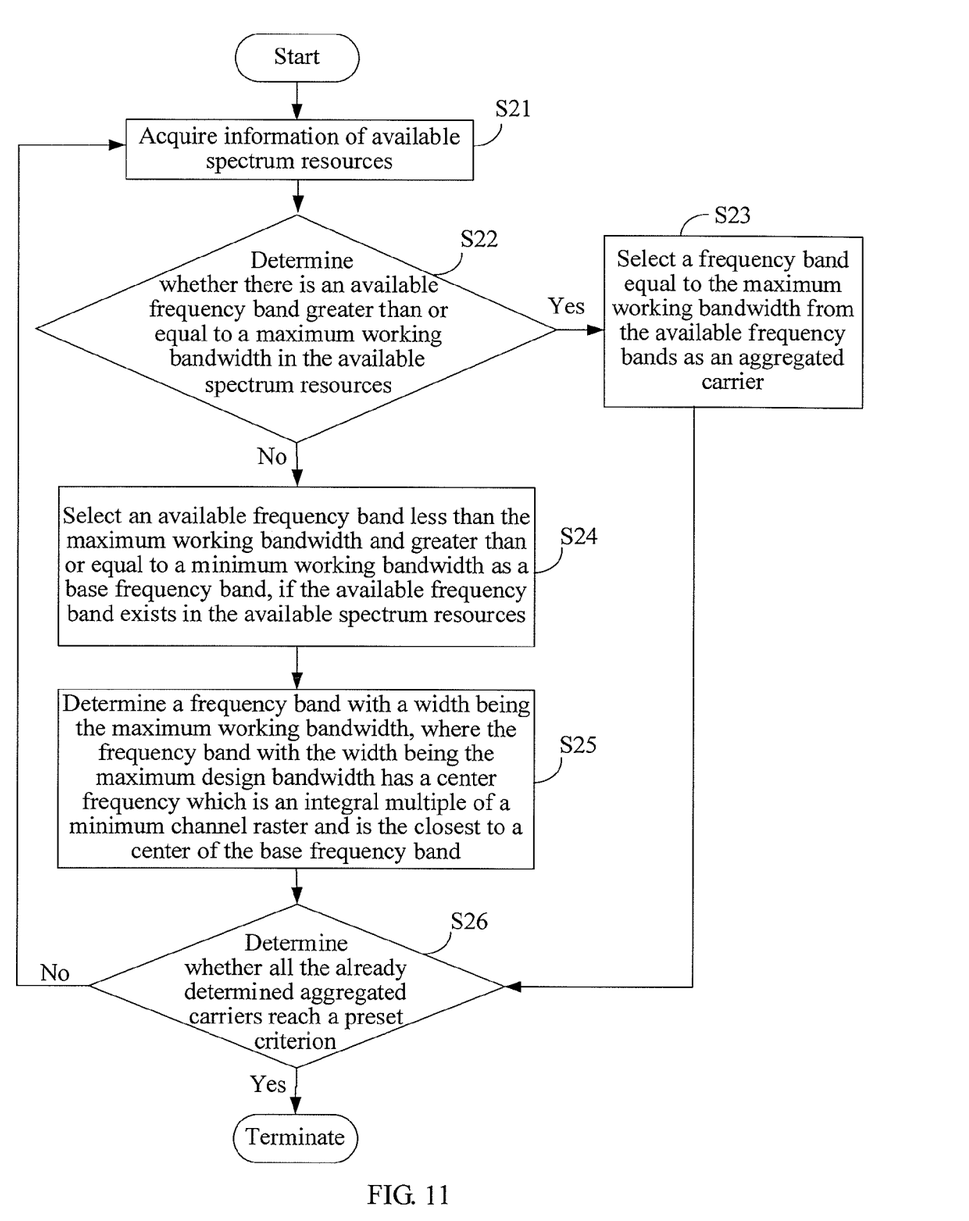
FIG. 11 is a schematic flow chart of a carrier aggregation method according to Embodiment 2 of the present invention.

FIG. 11 is a schematic flow chart of a carrier aggregation method according to Embodiment 2 of the present invention. The method is an exemplary embodiment of the present invention, but is not intended to limit the present invention. The method includes the following.

Step S21: Acquire information of available spectrum resources, and perform step S22.

In this step, the aggregated carriers already determined by the system may be identified as unavailable frequency bands.

Step S22: Determine, according to the information of the available spectrum resources, whether there is an available frequency band greater than or equal to a maximum working bandwidth in the available spectrum resources. If there is an available frequency band greater than or equal to the maximum working bandwidth in the available spectrum resources, perform step S23; if there is no available frequency band greater than or equal to the maximum working bandwidth in the available spectrum resources, perform step S24.

Step S23: Select a frequency band equal to the maximum working bandwidth from the available frequency bands as an aggregated carrier, and perform step S26.

With 3GPP LTE as an example, a maximum working bandwidth of the system is 20 MHz, and a minimum working bandwidth is 1.4 MHz. When a frequency band greater than or equal to 20 MHz exists in the available spectrum resources, a frequency band equal to 20 MHz is selected from the available frequency bands greater than or equal to 20 MHz as the aggregated carrier. Preferably, a 20 MHz frequency band being the closest to an already determined aggregated carrier may be selected from the available frequency bands as the aggregated carrier; or a 20 MHz frequency band being the closest to an unavailable frequency band may be selected from the available frequency bands as the aggregated carrier.

Step S24: Select an available frequency band less than the maximum working bandwidth and greater than or equal to a minimum working bandwidth as a base frequency band, if the available frequency band exists in the available spectrum resources, and perform step S25. If the available frequency band greater than or equal to the minimum working bandwidth does not exist, the carrier aggregation process is terminated.

If the available frequency band greater than or equal to 20 MHz does not exist in the spectrum resources of the 3GPP LTE system, the frequency band that is less than 20 MHz and greater than 1.4 MHz is further found in the spectrum resources, and the aggregated carrier may be selected by using the frequency band as a reference.

Step S25: Determine a frequency band with a width being the maximum working bandwidth, where the frequency band with the width being the maximum design bandwidth has a center frequency which is an integral multiple of a minimum channel raster and is the closest to a center of the base frequency band, and perform step S26.

In the 3GPP LTE system, the minimum channel raster of the center carrier frequency is 100 KHz, and a 20 MHz frequency band may be determined as the aggregated carrier and the frequency band has a center frequency which is the closest to the center of the base frequency band and is an integral multiple of 100 KHz, and the aggregated carrier may include available frequency bands or unavailable frequency bands. In this step, aggregated carriers which are already determined by the system may be identified as unavailable frequency bands.

Step S26: Determine whether all the already determined aggregated carriers reach a preset criterion. If all the determined aggregated carriers reach the preset criterion, terminate the carrier aggregation process; if all the determined aggregated carriers do not reach the preset criterion, re-perform step S21.

In step S26, if a sum of bandwidths of all the determined aggregated carriers meets a requirement for aggregating bandwidths, and/or the number of all the determined aggregated carriers reaches the maximum carrier number, the carrier aggregation process is terminated; if the sum of bandwidths of all the determined aggregated carriers does not meet the requirement for aggregating bandwidths, and/or the number of all the determined aggregated carriers does not reach the maximum carrier number, it is proved that the aggregated carriers still cannot meet the preset requirement, and the aggregation process needs to be continued, and then step S21 and the carrier aggregation process following step S21 are repeated. For example, if a 60 MHz bandwidth needs to be used in high-speed communication, multiple aggregated carriers less than or equal to 20 MHz may be aggregated to form a 60 MHz bandwidth. After multiple times of aggregation, a total bandwidth of the aggregated carriers is up to 60 MHz, and then the aggregation process may be terminated; and if the total bandwidth of the aggregated carriers does not reach 60 MHz, the carrier aggregation process needs to be continued. The determining whether all the determined aggregated carriers reach the preset criterion may be implemented by other methods, and this embodiment is not limited thereto.

According to this embodiment, the aggregated carrier is selected from the available frequency bands that is greater than the maximum working bandwidth to implement the carrier aggregation. When the available frequency bands that are greater than the maximum working bandwidth do not exist, the carrier aggregation is performed. In the aggregation, an available frequency band less than the maximum working bandwidth and greater than or equal to the minimum working bandwidth is selected as a reference, and a frequency equal to an integral multiple of the minimum channel raster is selected as the center frequency. The determined aggregated carrier may include multiple available or unavailable available frequency bands, and not each available frequency band needs to be configured with a synchronization channel, a broadcast channel, and a baseband processing unit as a separate carrier, so as to save the resources and decrease the system complexity. Even if an available frequency band less than the minimum working bandwidth exists in the aggregated carrier determined by the method according to the embodiment, the available frequency band can also be used, so as to improve the frequency spectrum utilization.

Embodiment 3

Figure 12:
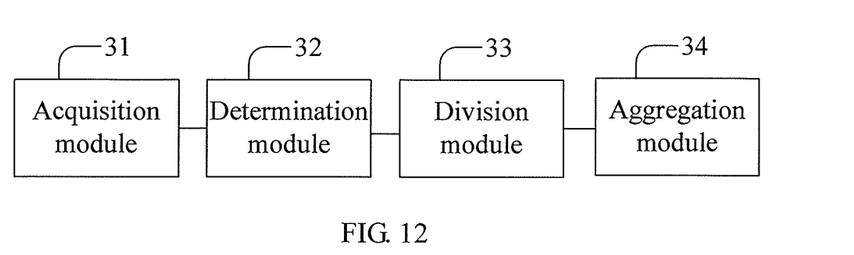
FIG. 12 is a schematic diagram of a carrier aggregation device according to Embodiment 3 of the present invention.

FIG. 12 is a schematic diagram of a carrier aggregation device according to Embodiment 3 of the present invention. The device may include:

an acquisition module 31, configured to acquire information of available spectrum resources;

a determination module 32, configured to acquire the information of the available spectrum resources from the acquisition module 31, and select an available frequency band less than a maximum design bandwidth and greater than or equal to a minimum design bandwidth as a base frequency band when the available frequency band exists in the available spectrum resources;

a division module 33, configured to determine a frequency band with a width being the maximum design bandwidth, where the frequency band with the width being the maximum design bandwidth has a center frequency which is an integral multiple of a minimum channel raster and is the closest to a center of the base frequency band; and an aggregation module 34, configured to determine an aggregated carrier by using the frequency band with the width being the maximum design bandwidth.

The device according to this embodiment can implement carrier aggregation, so as to meet the requirement of high-speed data transmission, and the number of synchronization channels, broadcast channels, and baseband processing units that are needed by the aggregated carrier is small, so as to decrease the system complexity and effectively utilize the spectrum resources.

In the device, the determination module 32 may further include: a first selection unit, configured to acquire the information of the available spectrum resources from the acquisition module 31, and select an available frequency band being the closest to a determined aggregated carrier from multiple available frequency bands less than the maximum design bandwidth and greater than or equal to the minimum design bandwidth when the multiple available frequency bands exist in the available spectrum resources, or select an available frequency band with a maximum width from the multiple available frequency bands; and a first determination unit, configured to use the available frequency band, which is selected by the first selection unit, as the base frequency band.

Further, the device may further include a selection module, configured to acquire the information of the available spectrum resources from the acquisition module 31, and select a frequency band equal to the maximum design bandwidth from the available frequency bands greater than or equal to the maximum design bandwidth as the aggregated carrier when the available frequency bands exist in the available spectrum resources.

In a specific implementation, the aggregation module 34 in the device may be configured to directly determine the frequency band with the width being the maximum design bandwidth as the aggregated carrier.

In another specific optimized implementation, the aggregation module 34 in the device may include:

an available frequency determination unit, configured to find an available frequency that is the farthest from the center frequency in the frequency band with the width being the maximum design bandwidth;

a width determination unit, configured to determine a width between the center frequency and the available frequency that is the farthest from the center frequency; and an aggregated carrier determination unit, configured to determine the aggregated carrier with a bandwidth being 2 times of the width determined by the width determination unit, where a carrier center frequency of the aggregated carrier is the center frequency.

Much further, the selection module may include: a second selection unit, configured to acquire the information of the available spectrum resources from the acquisition module 31, and select a frequency band being the closest to a determined aggregated carrier and equal to the maximum design bandwidth from the available frequency bands greater than or equal to the maximum design bandwidth when the available frequency bands exist in the available spectrum resources, or select a frequency band being the closest to an unavailable frequency band and equal to the maximum design bandwidth from the available frequency bands; and a second determination unit, configured to use the available frequency band, which is selected by the second selection unit, as the aggregated carrier. Such a device can effectively use the available frequency band greater than or equal to the maximum design bandwidth, so as to implement the carrier aggregation.

Further, the device may further include a judgment module, configured to acquire information of the determined aggregated carriers from the aggregation module 34, determine whether all the determined aggregated carriers reach a preset criterion. If all the determined aggregated carriers reach the preset criterion, instruct the acquisition module to stop acquiring the information of the available spectrum resources; if all the determined aggregated carriers do not reach the preset criterion, instruct the acquisition module to continue acquiring the information of the available spectrum resources. The process for determining whether all the determined aggregated carriers reach the preset criterion may refer to the foregoing method embodiment, and is not further described in detail herein again.

Similar to the method embodiment, the maximum design bandwidth in the device embodiment may be the maximum working bandwidth of the system; and the minimum design bandwidth may be the minimum working bandwidth of the system. It can be understood that, in the device embodiment, each implementation device may be located in various communication equipment such as a base station, and is configured to implement the carrier aggregation, thereby improving the utilization of the spectrum resources. The device may further include an identification module, configured to identify the already determined aggregated carriers as unavailable frequency bands. The carrier aggregation device according to this embodiment is applicable to wireless communication equipment, including, but not limited to, a base station and a terminal.

According to the embodiment of the present invention, multiple aggregated carriers may be aggregated into a higher frequency band. In this way, the requirement of high-speed data transmission is met, and the number of the synchronization channels, the broadcast channels and the baseband processing units as required is small, the system complexity is lowered, and the spectrum resources are effectively utilized. According to the embodiment of the present invention, the frequency band less than the minimum working bandwidth can also be effectively used, so as to improve the frequency spectrum utilization.

Those of ordinary skill in the art should understand that all or a part of the steps of the method according to the embodiments of the present invention may be implemented by a computer program instructing relevant hardware. The program may be stored in a computer readable storage medium. When the program runs, the steps of the method according to the embodiments of the present invention are performed. The storage medium may be a magnetic disk, an optical disk, a Read-Only Memory (ROM), or a Random Access Memory (RAM).

The descriptions above are only exemplary embodiments of the present invention. It should be pointed out that, numerous modifications and variations may be made by those of ordinary skill in the art without departing from the principle of the present invention, and the modifications and variations should also fall within the protection scope of the present invention.

What is claimed is:

1. In a system having multiple available frequency bands and one or more unavailable frequency bands, a carrier aggregation method comprising:
   acquiring, by a carrier aggregation device, information of available spectrum resources;
   selecting, by the carrier aggregation device, an available frequency band less than a maximum design bandwidth and greater than or equal to a minimum design bandwidth as a base frequency band when the available frequency band exists in the available spectrum resources;
   determining, by the carrier aggregation device, a frequency band with a width being the maximum design bandwidth and including at least a portion of an unavailable frequency band, wherein the determined frequency band has a center frequency which is an integral multiple of a minimum channel raster and is the closest to a center of the base frequency band; and
   determining, by the carrier aggregation device, an aggregated carrier by using the determined frequency band with the width being the maximum design bandwidth.

2. The method according to claim 1, wherein determining the aggregated carrier by using the frequency band with the width being the maximum design bandwidth comprises:
   directly determining the frequency band with the width being the maximum design bandwidth as the aggregated carrier; or finding an available frequency that is the farthest from the center frequency in the frequency band with the width being the maximum design bandwidth, determining a width between the center frequency and the available frequency that is the farthest from the center frequency, and determining the aggregated carrier with a bandwidth that is 2 times of the determined width, wherein a carrier center frequency of the aggregated carrier is the center frequency.

3. The method according to claim 1, wherein selecting the available frequency band less than the maximum design bandwidth and greater than or equal to the minimum design bandwidth as the base frequency band when the available frequency band exists in the available spectrum resources, comprises:
   selecting an available frequency band closest to an already determined aggregated carrier from multiple available frequency bands as the base frequency band when the multiple available frequency bands less than the maximum design bandwidth and greater than or equal to the minimum design bandwidth exist in the available spectrum resources; or selecting an available frequency band with the width being the maximum in the multiple available frequency bands as the base frequency band.

4. The method according to claim 1, wherein selecting the available frequency band less than the maximum design bandwidth and greater than or equal to the minimum design bandwidth as the base frequency band when the available frequency band exists in the available spectrum resources, comprises:
   using multiple available frequency bands less than the maximum design bandwidth and greater than or equal to the minimum design bandwidth as base frequency bands when the multiple available frequency bands exist in the available spectrum resources; and
   wherein determining the frequency band with the width being the maximum design bandwidth, wherein the frequency band with the width being the maximum design bandwidth has the center frequency which is the integral multiple of the minimum channel raster and is the closest to the center of the base frequency band, comprises:
   finding multiple frequency bands with a width being the maximum design bandwidth, wherein the frequency bands with the width being the maximum design bandwidth respectively have a center frequency which is an integral multiple of the minimum channel raster and are the closest to the center of the base frequency band;

comparing sums of widths of available frequency bands in each one of the multiple frequency bands with the width being the maximum design bandwidth respectively; and determining a frequency band with a maximum sum in the multiple frequency bands with the width being the maximum design bandwidth.

5. The method according to claim 1, wherein the process of the carrier aggregation further comprises identifying the aggregated carrier that is determined as an unavailable frequency band.

6. The method according to claim 1, wherein the maximum design bandwidth is a maximum working bandwidth of a system; and the minimum design bandwidth is a minimum working bandwidth of the system.

7. The method according to claim 1, wherein the process of the carrier aggregation further comprises:

selecting a frequency band equal to the maximum design bandwidth from available frequency bands greater than or equal to the maximum design bandwidth as the aggregated carrier, when the available frequency bands exist in the available spectrum resources.

8. The method according to claim 7, wherein selecting the frequency band equal to the maximum design bandwidth from the available frequency bands as the aggregated carrier comprises:

selecting a frequency band being the closest to a determined aggregated carrier and being equal to the maximum design bandwidth from the available frequency bands as the aggregated carrier; or selecting a frequency band being the closest to an unavailable frequency band and being equal to the maximum design bandwidth from the available frequency bands as the aggregated carrier.

9. The method according to claim 1, further comprising: determining whether all determined aggregated carriers reach a preset criterion, stopping the process of the carrier aggregation if all the determined aggregated carriers reach the preset criterion; and repeating the process of the carrier aggregation if all the determined aggregated carriers do not reach the preset criterion.

10. The method according to claim 9, wherein determining whether all the determined aggregated carriers reach the preset criterion comprises: determining whether a sum of bandwidths of all the determined aggregated carriers meets a requirement for aggregating bandwidths, or whether the number of all the determined aggregated carriers reaches the maximum carrier number.

11. In a system having multiple available frequency bands and one or more unavailable frequency bands, a carrier aggregation device, comprising:

an acquisition module, configured to acquire information of available spectrum resources;

a determination module, configured to acquire the information of the available spectrum resources from the acquisition module, and select an available frequency band less than a maximum design bandwidth and greater than or equal to a minimum design bandwidth as a base frequency band when the available frequency band exists in the available spectrum resources;

a division module, configured to determine a frequency band with a width being the maximum design bandwidth and including at least a portion of an unavailable frequency band, wherein the determined frequency band has a center frequency which is an integral multiple of a minimum channel raster and is the closest to a center of the base frequency band; and an aggregation module, configured to determine an aggregated carrier by using the determined frequency band with the width being the maximum design bandwidth.

12. The device according to claim 11, wherein the aggregation module is configured to directly determine the frequency band with the width being the maximum design bandwidth as the aggregated carrier.

13. The device according to claim 11, wherein the aggregation module comprises:

an available frequency determination unit, configured to find an available frequency that is the farthest from the center frequency in the frequency band with the width being the maximum design bandwidth;

a width determination unit, configured to determine a width between the center frequency and the available frequency that is the farthest from the center frequency; and an aggregated carrier determination unit, configured to determine the aggregated carrier with a bandwidth that is 2 times of the width, wherein a carrier center frequency of the aggregated carrier is the center frequency determined by the width determination unit.

14. The device according to claim 11, wherein the determination module comprises:

a first selection unit, configured to acquire the information of the available spectrum resources from the acquisition module, and select an available frequency band being the closest to a determined aggregated carrier from multiple available frequency bands less than the maximum design bandwidth and greater than or equal to the minimum design bandwidth when the multiple available frequency bands exist in the available spectrum resources, or select an available frequency band whose width is the maximum in the multiple available frequency bands; and a first determination unit, configured to use the available frequency band, which is selected by the first selection unit, as the base frequency band.

15. The device according to claim 11, further comprising:

a selection module, configured to acquire the information of the available spectrum resources from the acquisition module, and select a frequency band equal to the maximum design bandwidth from available frequency bands greater than or equal to the maximum design bandwidth as the aggregated carrier when the available frequency bands exist in the available spectrum resources.

16. The device according to claim 15, wherein the selection module comprises:

a second selection unit, configured to acquire the information of the available spectrum resources from the acquisition module, and select a frequency band being the closest to a determined aggregated carrier and being equal to the maximum design bandwidth from the available frequency bands greater than or equal to the maximum design bandwidth when the available frequency bands exist in the available spectrum resources, or select a frequency band being the closest to an unavailable frequency band and being equal to the maximum design bandwidth from the available frequency bands; and a second determination unit, configured to use the available frequency band, which is selected by the second selection unit, as the aggregated carrier.

17. The device according to claim 11, further comprising an identification module, configured to identify the aggregated carrier that is determined as an unavailable frequency band.

18. The device according to claim 11, wherein the maximum design bandwidth is a maximum working bandwidth of a system; and the minimum design bandwidth is a minimum working bandwidth of the system.

19. The device according to claim 11, further comprising:
a judgment module, configured to acquire information of determined aggregated carriers from the aggregation module, determine whether all the determined aggregated carriers reach a preset criterion, instruct the acquisition module to stop acquiring the information of the available spectrum resources if all the determined aggregated carriers reach the preset criterion, and instruct the acquisition module to continue acquiring the information of the available spectrum resources if all the determined aggregated carriers do not reach the preset criterion.

* * * * *